No. 706,470. Patented Aug. 5, 1902.
P. A. WHITNEY.
ANIMAL TRAP.
(Application filed Mar. 4, 1902.)

(No Model.)

Witnesses
C. F. Kilgore
M. H. C. Duby

Inventor
Pardon A. Whitney
G. [signature]
Attorneys

UNITED STATES PATENT OFFICE.

PARDON A. WHITNEY, OF SOUTHINGTON, CONNECTICUT.

ANIMAL-TRAP.

SPECIFICATION forming part of Letters Patent No. 706,470, dated August 5, 1902.

Application filed March 4, 1902. Serial No. 96,625. (No model.)

*To all whom it may concern:*

Be it known that I, PARDON A. WHITNEY, a citizen of the United States of America, residing at Southington, in the county of Hartford and State of Connecticut, have invented certain new and useful Improvements in Animal-Traps, of which the following is a specification.

The object of my invention is to provide a trap having features of novelty and advantage.

Figure 1:
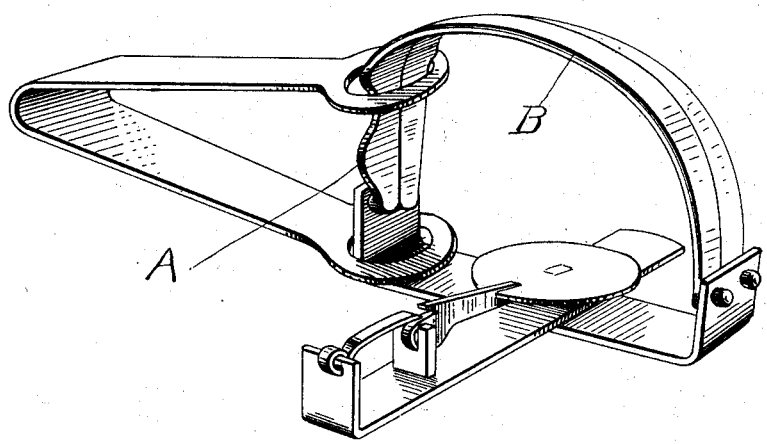
Figure 2:
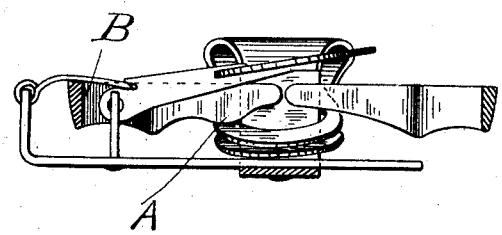

In the drawings, Figure 1 is a perspective view of the trap with the jaws closed. Fig. 2 is a sectional end view with the jaws open.

I have noticed in traps of this class as they are built at the present time that when they are opened the free jaw—that is to say, the one which is not held down by the latch—is invariably thrown up by the spring, so that it lies very much higher than the confined jaw. This makes it very much more difficult to conceal the traps than if the jaws were substantially in the same plane and in their lowest position, and another disadvantage is the fact that this jaw being raised is in the way of game and very often acts as an alarm to warn them away. There are other decided disadvantages in such an arrangement—as, for instance, the fact that when the trap is sprung one jaw has farther to move than the other, and they do not therefore come together at the same time and with the same quickness as they would otherwise. Having noticed these serious objections to traps of this kind, I have devised a means of overcoming these difficulties and of causing the jaws to rest in their lowest positions and in approximately the same planes one with the other. The means for accomplishing this object, which are shown in the drawings, consist in forming a lug or projection A on what I will term the "tripped" jaw B at a point where it will bear against the spring when the trap is sprung. Fig. 2 clearly illustrates the manner in which this lug acts on the spring, and it is found that by this construction the jaws of the trap when it is set lie substantially in the same plane and in the lowest positions. I thus overcome all of the objections to the spring-traps which have heretofore been made, and these objections are very serious ones when the nature of the use to which these traps are put is understood. There are other ways in which this same result can be accomplished—as, for instance, by lowering the pivotal point of the trip-jaw at the spring end of the trap—and I desire to include herein and in the following claims any such modifications which do not depart from the spirit of my invention.

I claim as my invention—

1. In a trap of the class specified the combination with the pair of pivoted jaws, of a latch engaging one of said jaws when in open position, and a spring, the one jaw which is engaged by the latch being provided with a projection adapted to engage the said spring.

2. In a trap of the class specified, the combination of the pair of pivoted jaws, one of said jaws being provided on its outer edge with an outwardly-projecting portion, a latch to engage the last-named jaw, and a spring adapted to be engaged by the projected portion of the said jaw when in open position, whereby both jaws are held in substantially the same plane.

In testimony whereof I affix my signature in presence of two witnesses.

PARDON A. WHITNEY.

Witnesses:
 F. A. SUTLIFFE,
 E. M. STANNARD.